United States Patent [19]

Tsuji et al.

[11] 4,013,618
[45] Mar. 22, 1977

[54] THERMALLY STABILIZED POLYESTER-POLYETHER BLOCK COPOLYMER COMPOSITION

[75] Inventors: Shozo Tsuji; Takahisa Minami; Misao Sumoto, all of Otsu, Japan

[73] Assignee: Toyobo Co., Ltd., Japan

[22] Filed: Dec. 31, 1974

[21] Appl. No.: 537,760

[30] Foreign Application Priority Data

Dec. 31, 1973 Japan .................................. 49-1189

[52] U.S. Cl. .................. 260/45.8 N; 260/45.85 B; 260/45.95 A; 260/45.9 QA; 260/45.9 NC; 260/45.9 NN; 260/45.7 P; 260/45.85 S

[51] Int. Cl.² .......................................... C08J 3/20

[58] Field of Search ........... 260/45.9 NC, 45.9 NN, 260/45.8 N

[56] References Cited

UNITED STATES PATENTS

| | | | |
|---|---|---|---|
| 3,357,944 | 12/1967 | Dexter | 260/45.9 NC |
| 3,440,210 | 4/1969 | Blorent et al. | 260/45.9 NC |
| 3,734,884 | 5/1973 | Dunnenberger et al. | 260/45.9 NC |
| 3,734,885 | 5/1973 | Muller et al. | 260/45.9 NC |
| 3,806,358 | 4/1974 | Glander et al. | 260/45.9 NC |
| 3,856,749 | 12/1974 | Hoeschele | 260/45.9 NC |

Primary Examiner—V. P. Hoke
Attorney, Agent, or Firm—Birch, Stewart, Kolasch and Birch

[57] ABSTRACT

A polyester-polyether block copolymer composition being very stable even in the presence of heavy metals, which comprises a polyester-polyether block copolymer consisting of segments of polyester units and segments of polyether units; at least one compound containing the group of the following formula:

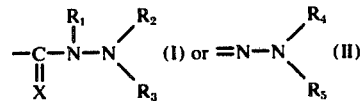

wherein X is oxygen or sulfur, $R_1$, $R_2$ and $R_3$ are each hydrogen or an organic residue, or $R_2$ and $R_3$ forms a Schiff's base with the adjacent nitrogen, and $R_4$ and $R_5$ are each hydrogen or an organic residue; at least one radical scavenger and/or at least one peroxide decomposer.

17 Claims, No Drawings

THERMALLY STABILIZED POLYESTER-POLYETHER BLOCK COPOLYMER COMPOSITION

The present invention relates to a polyester-polyether block copolymer composition. More particularly, it relates to a composition comprising a polyester-polyether block copolymer consisting of segments of polyester units and segments of polyether units; at least one compound containing the group of the following formula:

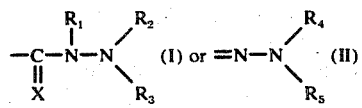

wherein X is oxygen or sulfur, $R_1$, $R_2$ and $R_3$ are each hydrogen or an organic residue, or $R_2$ and $R_3$ forms a Schiff's base with the adjacent nitrogen, and $R_4$ and $R_5$ are each hydrogen or an organic residue; at least one radical scavenger and/or at least one peroxide decomposer, which is very stable in the presence of heavy metals.

Hitherto, the polyester-polyether block copolymers which mutually contain polyester units and polyether units in the molecule have been known as polymers having elastomeric properties. However, the polyester-polyether block copolymers are deteriorated by oxygen or ozone in the air, and as the results, the polymers have undesirable properties, such as coloring, breakage of the surface, opaqueness and a further decreasing of strength, elongation and the degree of polymerization. The deterioration is promoted particularly by heat, light or heavy metals.

For preventing such undesirable deterioration of the polymer, it is possible to incorporate various stabilizers into the polyester-polyether block copolymer and there are found only a few reports thereon, for instance, the incorporation of a radical scavenger, a peroxide decomposer and an ultraviolet absorber for preventing the deterioration induced by heat or light (Japanese patent publication Nos. 37423/1971 and 42025/1971). However, it has never been known to prevent the deterioration by heavy metals (e.g., nickel, cobalt, iron, copper or zinc) at a high temperature. Moreover, the conventional stabilizers can not exhibit a sufficient effect against such deterioration by heavy metals. The deterioration of polymers induced by heavy metals occurs frequently, particularly, in the process for the production thereof wherein the polymers are contacted with the catalysts, various additives and the reaction vessel, and further in the use of the polymer. Accordingly, it is highly desired in this field to find a method for preventing such deterioration by heavy metals.

Under the circumstances, the present inventors have intensively studied to find a method for preventing effectively such deterioration of the polymers by heavy metals, and found that it can be done by combining a specific >N—N< group-containing compound, which is not effective when it is used alone, with a conventional phenolic or amine radical scavenger and/or a peroxide decomposer.

An object of the present invention is to provide a polyester-polyether block copolymer composition which is very stable even in the presence of heavy metals.

Another object of the invention is to provide an improved method for preventing the deterioration of polyester-polyether block copolymers by heavy metals by incorporating a specific >N—N< group-containing compound, a radical scavenger and/or a peroxide decomposer.

These and other objects of the invention will be apparent from the description hereinafter.

The stable polyester-polyether block copolymer composition of the present invention comprises a polyester-polyether block copolymer consisting of segments of polyester units and segments of polyether units; at least one compound containing the group of the following formula:

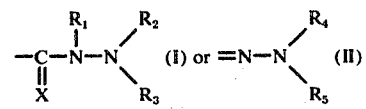

wherein X is oxygen or sulfur, $R_1$, $R_2$ and $R_3$ are each hydrogen or an organic residue, or $R_2$ and $R_3$ forms a Schiff's base with the adjacent nitrogen, and $R_4$ and $R_5$ are each hydrogen or an organic residue; at least one phenolic or amine radical scavenger and/or at least one peroxide decomposer.

The organic residues of $R_1$, $R_2$, $R_3$, $R_4$ and $R_5$ in the above groups (I) and (II) include a straight or branched, saturated or unsaturated aliphatic hydrocarbon group, a saturated or unsaturated alicyclic hydrocarbon group, an aromatic hydrocarbon group, a heterocyclic group, a group wherein a hydrocarbon or heterocyclic group as mentioned above bonds to the nitrogen via oxygen, sulfur, imino, sulfinyl, sulfonyl, carbonyl, thiocarbonyl, hydrazo, or the like (e.g., alkoxy, alkylthio, aryloxy, arylthio, acyl, acyloxy, alkoxycarbonyl, aryloxycarbonyl or acylthio), carbazoyl ($H_2NNHCO-$), thiocarbazoyl ($H_2NNHCS-$), hydrazino, and a group wherein any C—C bond in the hydrocarbon groups as mentioned above may be intervened with oxygen, sulfur, imino, sulfinyl, sulfonyl or the like. These organic residues may be substituted by hydroxy, mercapto, a halogen, nitro, an alkyl, an aryl, an alkoxy, an aryloxy, an acyl, amino, hydrazino, cyano, an alkoxycarbonyl, carbazoyl, thiocarbazoyl, a heterocyclic group, or the like.

The compounds containing the group of the formula (I) or (II) include an aliphatic, alicyclic or aromatic hydrocarbon and a heterocyclic compound, to which the group of the formula (I) or (II) bonds directly or via oxygen, sulfur, imino, sulfinyl, sulfonyl, carbonyl, thiocarbonyl, hydrazo, —NHNHCO—, —NHNHCS— or the like, and further these compounds may be substituted by hydroxy, mercapto, a halogen, nitro, an alkyl, an aryl, an alkoxy, an aryloxy, an acyl, amino, hydrazino, cyano, an alkoxycarbonyl, carbazoyl, thiocarbazoyl, a heterocyclic group, or the like, and any C—C bond in the compounds may be intervened with oxygen, sulfur, imino, sulfinyl, sulfonyl, or the like.

Representative examples of the compounds are as follows:

The examples of the compounds containing the group (I) are those of the following formulae:

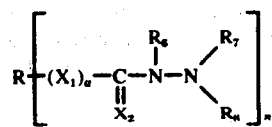 (III)

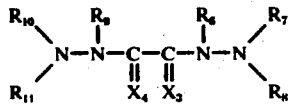 (IV)

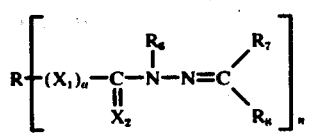 (V)

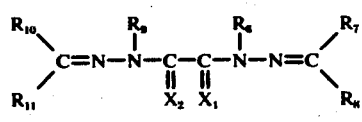 (VI)

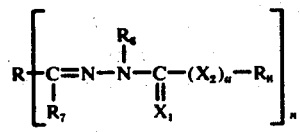 (VII)

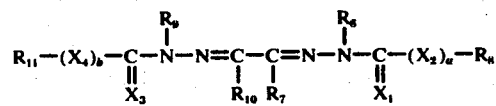 (VIII)

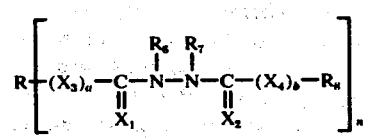 (IX)

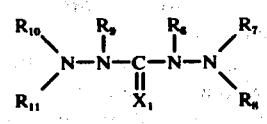 (X)

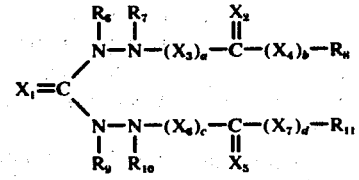 (XI)

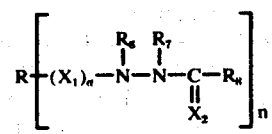 (XII)

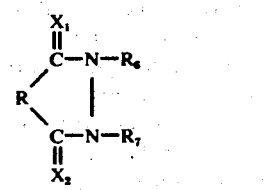 (XIII)

The examples of the compounds containing the group (II) are those of the following formulae:

 (XIV)

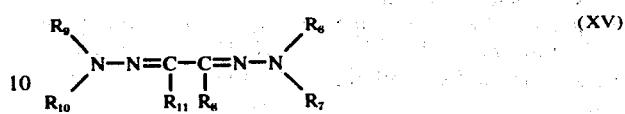 (XV)

In the above formulae (III) to (XV), $X_1$, $X_2$, $X_3$, $X_4$, $X_5$, $X_6$ and $X_7$ are the same or different and are each oxygen or sulfur; $a$, $b$, $c$ and $d$ are the same or different and are each 0 or 1; $n$ is an integer of 1 to 4; and R, $R_6$, $R_7$, $R_8$, $R_9$, $R_{10}$ and $R_{11}$ are the same or different and are each hydrogen, a straight or branched, saturated or unsaturated aliphatic hydrocarbon group, a saturated or unsaturated alicyclic hydrocarbon group, an aromatic hydrocarbon group, a heterocyclic group, a group wherein the hydrocarbon or heterocyclic group as mentioned above bonds to the nitrogen via oxygen, sulfur, imino, sulfinyl, sulfonyl, carbonyl, thiocarbonyl, hydrazo or the like (e.g., alkoxy, alkylthio, aryloxy, arylthio, acyl, acyloxy, alkoxycarbonyl, aryloxycarboxyl or acylthio), carbazoyl, thiocarbazoyl, hydrazino, and a group wherein any C—C bond in the hydrocarbon groups as mentioned above is intervened with oxygen, sulfur, imino, sulfinyl, sulfonyl or the like, and these groups may be substituted by hydroxy, mercapto, a halogen, nitro, an alkyl, an aryl, an alkoxy, an aryloxy, an acyl, amino, hydrazino, cyano, an alkoxycarbonyl, carbazoyl, thiocarbazoyl, a heterocyclic group or the like.

The hydrocarbon groups include a straight or branched, saturated or unsaturated, monovalent chain hydrocarbon group (e.g., methyl, ethyl, propyl, isopropyl, butyl, allyl, isopropenyl, ethynyl, 2-propynyl, 1-propenyl, 2-butenyl or 2-pentenyl); a straight or branched, saturated or unsaturated, di-, tri- or tetravalent chain hydrocarbon group (e.g., methylidyne, ethylidene, vinylidene, isopropylidene, methylene, ethylene, teimethylene, tetramethylene, pentamethylene, methylmethylene, ethylethylene, propylene, propenylene, vinylene, pentenylene, butanediylidene, 1-propanyl-3-ylidene, 1,2,3-propanetriyl or 1,3-propanediyl-2-ylidene); a saturated or unsaturated, mono-, di-, tri- or tetravalent alicyclic hydrocarbon group (e.g., cyclohexyl, cyclopentyl, 2-cyclopenten-1-yl, cyclopentylidene, 2,4-cyclohexadien-1-ylidene, 1,3-cyclopentylene, 1,2-cyclohexylene or 2,5-cyclohexadien-1,4-ylene); a mono-, di-, tri- or tetravelent aromatic hydrocarbon group (e.g., phenyl, o-, m- or p-phenylene, α- or β-naphthyl, 2- or 3-indenyl, 1- or 2-pyrenyl, 1- or 2-anthryl, 1- or 2-phenanthryl, 1(4H)-naphthylidene, 2,7-phenanthrylene, 1,2,4-benzenetriyl or 1,4,5,8-anthracenetetrayl): or the like. Moreover, these cyclic hydrocarbon groups may have a crosslinking bond in the molecule, and any C—C bond in the chain of hydrocarbon groups may be intervened with oxygen, sulfur, imino, sulfinyl, sulfonyl or the like, and further the chain hydrocarbon group may be combined with the adjacent nitrogen to form a nitrogen-containing heterocyclic group.

The heterocyclic groups of R, $R_1$, $R_2$, $R_3$, $R_4$, $R_5$, $R_6$, $R_7$, $R_8$, $R_9$, $R_{10}$ or $R_{11}$ include a mono-, di-, tri- or tetravalent heterocyclic group containing one or more hetero atoms selected from oxygen, sulfur and nitrogen (e.g., indolyl, pyronyl, triazolyl, furyl, pyridyl, piperidyl, quinolyl, isoquinolyl, thienyl, piperidino, morpholino, 2-pyranylidene, 4(1H)-pyridylidene or 2,4-pyridinediyl).

These hydrocarbon groups and heterocyclic groups may have further various substituents (e.g., amino, nitro, cyano, halogen, hydroxy, carboxy, alkoxy, acyl, alkoxycarbonyl, acyloxy, mercapto, aryl, or heterocyclic group).

Representative examples of the >N—N< group-containing compounds are as follows:

CH₃CONHNH₂ (A-1)

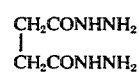 (A-2)

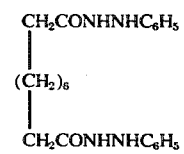 (A-3)

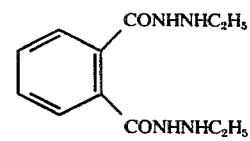 (A-4)

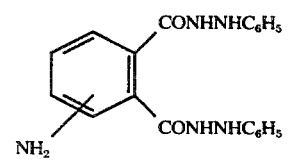 (A-5)

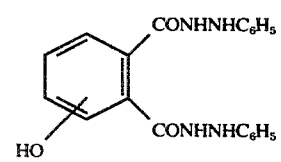 (A-6)

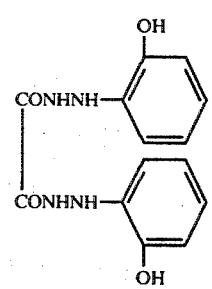 (A-7)

C₁₂H₂₅OCONHNHC₁₂H₂₅ (A-8)

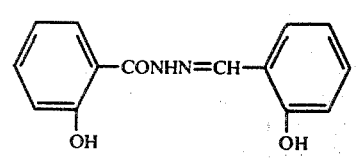 (A-9)

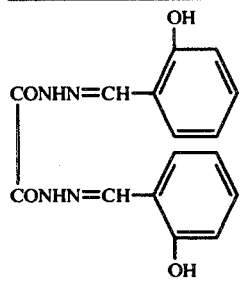 (A-10)

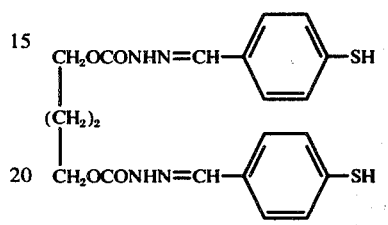 (A-11)

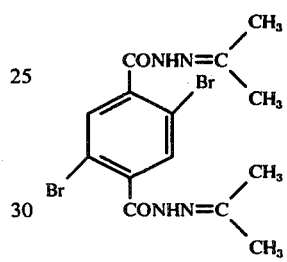 (A-12)

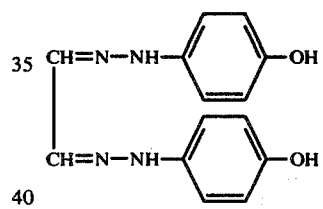 (A-13)

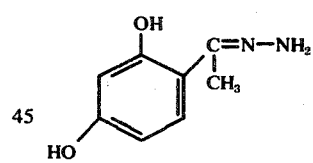 (A-14)

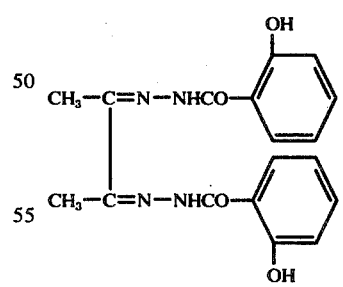 (A-15)

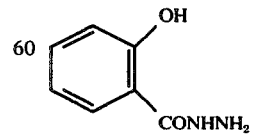 (A-16)

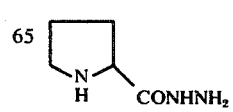 (A-17)

(A-18) [benzimidazole]-CONHNH₂

(A-19) [benzothiazole]-CONHNH₂

(A-20) [phenyl]-CONHNHCOCH₂SH (A-21) [thiazole]-CONHNHCOO-[phenyl]-OCH₃

(A-22) [phenyl]-CONHNHCSNHNHCO-[phenyl]

(A-23) [phenyl]-CSNHNHCONHNHCS-[phenyl]

(A-24) S(CH₂—CONHNHCOCH₂SH)₂

(A-25) [pyrrolidinone]-CONHN=CH-[phenyl-OH]

(A-26) [pyrrole]-CH(CH—CO—NH)(CH₂—CO—NH)

(A-27) ([triazole]-NHNHCOCH₂—)₂O (A-28) HSCH₂CSNHNH₂

(A-29) HSCH₂CONHNHCOCH₂SH (A-30) [phenyl-SH]-CONHNHCH₂-[phenyl]-NO₂

(A-31) ([phenyl]-NHNHCOCH₂—)₂SO (A-32) ([pyrrole]-CSNHNHCSCH₂—)₂NH (A-33) (NC-[phenyl]-CONHNHCH₂—)₂SO₂

(A-34) [phenyl with CH=NNHCOOC₁₂H₂₅, OCH₃, CH=NNHCOOC₁₂H₂₅]

(A-35) H₃COOC-[phenyl]-CONHNH₂

(A-36)

$$\text{S}\begin{pmatrix}\text{CH}_2\text{—CH}_2\text{—}\underset{\underset{\text{O}}{\|}}{\text{C}}\text{—}\underset{\text{R}}{\text{N}}\text{—}\underset{\text{R}'}{\text{N}}\text{—}\underset{\underset{\text{O}}{\|}}{\text{C}}\text{—[phenyl]}\\ \text{CH}_2\text{—CH}_2\text{—}\underset{\underset{\text{O}}{\|}}{\text{C}}\text{—}\underset{\text{R}}{\text{N}}\text{—}\underset{\text{R}'}{\text{N}}\text{—}\underset{\underset{\text{O}}{\|}}{\text{C}}\text{—[phenyl]}\end{pmatrix}$$

(R and R' are H or an alkyl having 4 to 8 carbon atoms)

(A-37) CH(CONHNHCOCH₃)(C₄H₉)(CONHNHCOCH₃)

(A-38)
$$\begin{matrix}\text{O}\\ \|\\ \text{C—NH—N=CH—[phenyl]}\\ |\\ \text{C—NH—N=CH—[phenyl]}\\ \|\\ \text{O}\end{matrix}$$

In the present specification, the terms "alkyl," "alkoxy," "alkylthio" and "alkoxycarbonyl" mean the group having 1 to 16, preferably 1 to 12, carbon atoms in the alkyl moiety, the terms "aryl," "aryloxy," "arylthio" and "aryloxycarbonyl" mean the group having 6 to 14 carbon atoms in the aryl nucleus, and the terms "acyl," "acyloxy" and "acylthio" mean an aliphatic acyl having 1 to 16 carbon atoms, an aromatic acyl having 7 to 15 carbon atoms or a heterocyclic acyl.

The polyester-polyether block copolymer composition of the present invention contains at least one compound containing the group (I) or (II) as mentioned above, which means that it may contain both the compound containing the group (I) and the compound containing the group (II), or may contain the compound containing two or more groups selected from the group (I) and the group (II) in the same molecule.

The other components incorporated into the present composition are a phenolic or amine radical scavenger and a peroxide decomposer. The radical scavenger and peroxide decomposer may be incorporated singly or together in the composition and further each may be used alone or in a mixture of two or more kinds thereof. By incorporating both the radical scavenger and the peroxide decomposer, the polyester-polyether block copolymer composition of the present invention can exhibit a more excellent effect for inhibiting the deterioration by heavy metals.

Representative examples of the phenolic radical scavenger are 2,6-di-tert.-butyl-4-methylphenol, 2,6-di-tert.-butyl-4-octylphenol, 2-methyl-6-tert.-butyl-4-methylphenol, 2-methyl-6-tert.-butyl-4-octylphenol, 2-methyl-6-tert.-butyl-4-nonylphenol, 2,2'-methylenebis(4-methyl-6-isopropylphenol), 2,2'-methylenebis(4-methyl-6-tert.-butylphenol), 2,2-methylene-bis(4-ethyl-6-tert.-butylphenol), 2,2'-methylenebis(4-tert.-butyl-6-methylphenol), 2,2'-methylenebis(4,6-di-tert.-butyl-phenol), 4,4'-methylenebis(2,6-di-tert.-butylphenol), 4,4'-methylenebis(2-methyl-6-tert.-butylphenol), 4,4'-methylene-bis(2-tert.-butyl-5-methylphenol), 2,2'-ethylidenebis(4-methyl-6-tert.-butylphenol), 2,2'-ethylidenebis(4,6-di-tert.-butylphenol), 2,2'-isopropylidenebis(4-methyl-6-isopropyl-phenol), 2,2'-isopropylidenebis(4-isopropyl-6-methylphenol), 2,2'-isopropylidenebis(4-methyl-6-tert.-butylphenol), 4,4'-isopropylidenebis(2,6-di-tert.-butylphenol), 4,4'-isopropylidenebis(2-methyl-6-tert.-butylphenol), 4,4'-isopropylidene-bis(2-tert.-butyl-5-methylphenol), 4,4'-butylidenebis(2-tert.-butyl-5-methylphenol), 4,4'-butylidenebis(2-methyl-6-tert.-butylphenol), 4,4'-butylidenebis(2,6-di-tert.-butylphenol), 4,4'-cyclohexylidenebis(2-methyl-6-tert.-butylphenol), 4,4'-cyclohexylidenebis(2-tert.-butyl-5-methylphenol), 4,4'-cyclohexylidenebis(2,6-di-tert.-butylphenol), 1,1,3-tris(2-methyl-4-hydroxy-5-tert.-butylphenyl)butane, 2,4,6-tris(3,5-di-tert.-butyl-4-hydroxybenzyl)-mesitylene, octyl 3,5-di-tert.-butyl-4-hydroxyhydrocinnamate, nonyl 3,5-di-tert.-butyl-4-hydroxyhydrocinnamate, lauryl 3-tert.-butyl-6-methyl-4-hydroxyhydrocinnamate, stearyl 3-tert.-butyl-6-methyl-4-hydroxyhydrocinnamate, lauryl 3,5-di-tert.-butyl-4-hydroxyhydrocinnamate, stearyl 3,5-di-tert.-butyl-4-hydroxyhydrocinnamate, ethyleneglycol bis(3,5-di-tert.-butyl-4-hydroxyhydrocinnamate), glycerin tris(3,5-di-tert.-butyl-4-hydroxyhydrocinnamate), pentaerythritol tetrakis(3,5-di-tert.-butyl-4-hydroxyhydrocinnamate), N-caproyl-4-aminophenol, N-octanoyl-4-aminophenol, N-lauroyl-4-aminophenol, N-stearoyl-4-aminophenol, N-(3-phenylpropionyl)-4-aminophenol, N-[3-(3,5-di-tert.-butyl-4-hydroxyphenyl)propionyl]-4-aminophenol, N-[3-(4-hydroxyphenyl)acryloyl]-4-aminophenol, N-benzoyl-4-aminophenol, 2,6-di-tert.-butyl-4-(p-toluenesulfonamidomethyl)phenol, 4-tert.-butylphenyl 3,5-di-tert.-butyl-4-hydroxycinnamate, 4-octylphenyl 3,5-di-tert.-butyl-4-hydroxyhydrocinnamate, 4-tert.-butylphenyl 3-methyl-5-tert.-butyl-4-hydroxyhydrocinnamate, phenyl 3-tert.-butyl-6-methyl-4-hydroxyhydrocinnamate, 4-tert.-butylphenyl 3,5-di-tert.-butyl-4-hydroxyhydrocinnamate, 4-nonylphenyl 3,5-di-tert.-butyl-4-hydroxycinnamate, 2,4,6-tri-tert.-butylphenol, N-lauroyl-2,6-dimethyl-4-aminophenol, N-stearoyl-2,6-diisopropyl-4-aminophenol, N-stearoyl-2,6-di-tert.-butyl-4-aminophenol, N-octanoyl-2,6-diisopropyl-4-aminophenol, N-caproyl-2-tert.-butyl-5-methyl-4-aminophenol, N-lauroyl-2-tert.-butyl-5-methyl-4-aminophenol, N-stearoyl-2-tert.-butyl-5-methyl-4-aminophenol, N-(3-phenylpropionyl)-2,6-di-tert.-butyl-4-aminophenol, N-[3-(3,5-di-tert.-butyl-4-hydroxyphenyl)propionyl]-2,6-di-tert.-butyl-4-aminophenol, N-[3-(3,5-di-tert.-butyl-4-hydroxyphenyl)acryloyl]-2,6-di-tert.-butyl-4-aminophenol, N-benzoyl-2,6-dimethyl-4-aminophenol, N-[3-(2-ethylhexyloxy)propionyl]-2,6-di-tert.-butyl-4-aminophenol, N-acetyl-4-hydroxybenzylamine, N-glycoloyl-4-hydroxybenzylamine, N-isobutylyl-4-hydroxybenzylamine, N-valeryl-4-hydroxybenzylamine, N-lauroyl-4-hydroxybenzylamine, N-lauroyl-4-hydroxy-3-tert.-butyl-6-methylbenzylamine, N-stearoyl-4-hydroxy-3,5-di-tert.-butylbenzylamine, N-stearoyl-4-hydroxy-3-tert.-butyl-6-methylbenzylamine, N-(4-tert.-butylbenzoyl)-4-hydroxy-3-methyl-5-tert.-butylbenzylamine, N-lauroyl-4-hydroxy-2-methylbenzylamine, N-caproyl-4-hydroxyphenethylamine, N-stearoyl-4-hydroxy-3,5-di.-tert.-butylphenethylamine, N-lauroyl-4-hydroxy-3-tert.-butyl-6-methylphenethylamine, N-stearoyl-4-hydroxy-3-methyl-5-tert.-butylphenethylamine, N-lauroyl-3-(4-hydroxy-3-methyl-5-tert.-butylphenyl)propylamine, N-phenylacetyl-4-hydroxybenzylamine, N-stearoyl-4-hydroxycinnamylamine, N-[3-(4-hydroxy-3,5-di-tert.-butylphenyl)propionyl]-4-hydroxy-3,5-di-tert.-butylbenzylamine, N,N'-bis(4-hydroxy-3,5-di-tert.-butylphenethyl)adipinamide, N,N'-bis(4-hydroxybenzyl)-sebacinamide, N,N'-bis(4-hydroxy-3-tert.-butyl-6-methylbenzyl)sebacinamide, N,N',N''-tris(4-hydroxy-3-tert.-butyl-5-methylbenzyl)citramide, 2,2'-thiobis(4-tert.-butylphenol), 2,2'-thiobis(4-methylphenol), 2,2'-thiobis(4-methyl-6-isopropylphenol), 2,2'-thiobis(4-methyl-6-tert.-butylphenol), 2,2'-thiobis(4-tert.-butyl-6-methylphenol), 2,2'-thiobis(4,6-di-tert.-butylphenol), 2,2'-thiobis(4-octylphenol), 2,2'-thiobis(4-nonylphenol), 2,2'-thiobis(4-decylphenol), 4,4'-thiobis-(2-methylphenol), 4,4'-thiobis(2-tert.-butylphenol), 4,4'-thiobis-(2,6-di-tert.-butylphenol), 4,4'-thiobis(2-methyl-6-tert.-butylphenol), 4,4'-thiobis(2-tert.-butyl-5-methylphenol), distearyl 3,5-di-tert.-butyl-4-hydroxybenzylphosphonate, dilauryl 3,5-di-tert.-butyl-4-hydroxybenzylphosphonate, di-n-octyl 3-tert.-butyl-6-methyl-4-hydroxybenzylphosphonate, distearyl 3-tert.-butyl-5-methyl-4-hydroxybenzylphosphonate, diphenyl 3,5-di-tert.-butyl-4-hydroxybenzylphosphonate, bis(4-tert.-butylphenyl) 3,5-di-tert.-butyl-4-hydroxybenzylphosphonate, distearyl 3,5-di-tert.-butyl-4-hydroxyphenethylphosphonate, distearyl 3,5-di-tert.-butyl-2-hydroxybenzylphosphonate, disteary 3,5-di-tert.-butyl-4-hydroxyphenylphosphonte, diphenyl 3,5-di-tert.-butyl-4-hydroxyphenylphosphonate), dilauryl 3,5-di-tert.-butyl-4-hydroxyphenylphosphonate, stearyl bis(3,5-di-tert.-butyl-4-hydroxyphenyl)phosphate, phenyl bis(3,5-di-tert.-butyl-4-hydroxyphenyl)phosphate, lauryl bis(3,5-di-tert.-butyl-4-hydroxyphenyl)phosphate, tris(3,5-di-tert.-butyl-4-hydroxyphenyl)phosphate or the like.

Representative examples of the amine radical scavenger are isopropoxydiphenylamine, aniline, N-methylaniline, phenyl-β-naphthylamine, N-benzylaniline, diphenylamine, phenyl-α-naphthylamine, di(octylphenyl)amine and acetone, butylaldehydeaniline condensation product, di-[p-(p-tolylsulfonylamido)-phenyl]-amine, di(p-methoxyphenyl)amine, p-phenylenediamine, N,N'-diphenyl-p-phenylenediamine, N,N'-di(β-naphthyl)-p-phenylenediamine, N-cyclohexyl-N'-phenyl-p-phenylenediamine, N,N'-dioctyl-p-phenylenediamine, N,N'-diphenylethylenediamine, N,N'-di(o-tolyl)ethylenediamine, N,N'- diphenylpropylenediamine, N,N'-di-sec.-butyl-p-phenylenediamine, di(aminophenyl)methane, N-isopropyl-N'-phenyl-p-phenylenediamine, m-tolylenediamine, 6-phenyl-2,2,4-trimethyldihydroquinoline, 6-ethoxy-2,2,4-trimethyldihydroquinoline, 2,6-diethyl-2,3,4-trimethyldihydroquinoline, 2,2,4-trimethyldihydroquinoline (monomer and polymer), p-aminophenol, o-hydroxy-p-phenylenediamine, p-hydroxy-o-phenylenediamine, o-aminophenol, o-hydroxy-p-toluidine, p-hydroxyl-o-toluidine, 4,4'-bis(α,α-dimethylbenzyl)diphenylamine or the like.

Among these radical scavengers, the suitable compounds are as follows:

| | |
|---|---|
| 2,6-di-tert.-butyl-4-methylphenol | (B-1) |
| 2,4,6-tri-tert.-butylphenol | (B-2) |
| 2,2'-methylenebis(4,6-di-tert.-butylphenol) | (B-3) |
| 4,4'-methylenebis(2,6-di-tert.-butylphenol) | (B-4) |
| 2,2'-ethylidenebis(4,6-di-tert.-butylphenol) | (B-5) |
| 4,4'-isopropylidenebis(2,6-di-tert.-butylphenol) | (B-6) |
| 4,4'-butylidenebis(2,6-di-tert.-butylphenol) | (B-7) |
| 2,4,6-tris(3,5-di-tert.-butyl-4-hydroxybenzyl)-mesitylene | (B-8) |
| pentaerythritol tetrakis(3,5-di-tert.-butyl-4-hydroxyhydrocinnamate) | (B-9) |
| N-caproyl-4-aminophenol | (B-10) |
| 2,2'-thiobis(4,6-di-tert.-butylphenol) | (B-11) |
| N,N'-di-sec.-butyl-p-phenylenediamine | (B-12) |
| phenyl-α-naphthylamine | (B-13) |
| N-phenyl-N'-isopropyl-p-phenylenediamine | (B-14) |
| N,N'-di-β-naphthyl-p-phenylenediamine | (B-15) |
| 4,4'-bis(α,α-dimethylbenzyl)diphenylamine) | (B-16) |

Among these radical scavengers, the particularly suitable compounds are 2,4,6-tris(3,5-di-tert.-butyl-4-hydroxybenzyl)mesitylene (B-8), pentaerythritol tetrakis(3,5-di-tert.-butyl-4-hydroxyhydrocinnamate) (B-9), N,N'-di-β-naphthyl-p-phenylenediamine (B-15) and 4,4'-bis(α,α-dimethylbenzyl)diphenylamine (B-16).

Representative examples of the peroxide decomposer used in the present invention are sulfur or phosphorus compounds, i.e., di-n-hexylsulfide, di-laurylsulfide, distearyl sulfide, dibenzylsulfide, diphenylsulfide, dioctyl thiodipropionate, dilauryl thiodipropionate, distearyl thiodipropionate, lauryl stearyl thiodipropionate, thiodiethanol dilaurate, thiodiethanol distearate, bis(dodecylthio)methane, bis(stearylthio)methane, 1,1-bis(stearylthio)ethane, 1,1-bis(laurylthio)ethane, 1,1-bis(laurylthio)butane, 1,1-bis(stearylthio)butane, phenyl-bis(laurylthio)methane, 2,2-bis(dodecylthio)propane, 2,2-bis-(stearylthio)propane, 1,1-bis(stearylthio)cyclohexane, 2,2-bis(dodecylthio)butane, 1-phenyl-1,1-bis(dodecylthio)ethane, diphenyl-bis(octadecylthio)methane, dodecylmercaptan, octadecylmercaptan, lauryl thioglycolate, stearyl thioglycolate, p-tert.-butylphenyl thioglycolate, lauryl 3-mercaptopropionate, stearyl 3-mercaptopropionate, benzyl 3-mercaptopropionate, nonylphenyl 3-mercaptopropionate, cyclohexyl 3-mercaptopropionate, lauryl 4-mercaptobutyrate, stearyl 4-mercaptobutyrate, lauryl 6-mercaptocapronate, stearyl 6-mercaptocapronate, cyclohexyl 6-mercaptocapronate, ethyleneglycol mercaptopropionate, benzoquinone thioglycolate, glycerine tris(6-mercaptocapronate), N-stearyl-mercaptoglycolamide, thioglycollic acid anilide, N-cyclohexyl-thioglycolamide, 3-mercaptopropionic acid anilide, N-cyclohexyl-3-mercaptopropionamide, 4-mercaptobutyramide, N-cyclohexyl-4-mercaptobutyramide, N-stearyl-4-mercaptobutyramide, 6-mercaptocapronic acid anilide, N-cyclohexyl-6-mercaptocapramide, N-lauryl-6-mercaptocapramide, N-stearyl-6-mercaptocapramide, N,N'-bis(3-mercaptopropionyl)xylylenediamine, N,N'-bis(mercaptoacetyl)xylylenediamine, tributylphosphite, trihexylphosphite, trioctylphosphite, trinonylphosphite, tridodecylphosphite, trioctadecylphosphite, triphenylphosphite, tricresylphosphite, tris(nonylphenyl)phosphite, tris(octylphenyl)phosphite, diphenyl decylphosphite, diphenyl dodecylphosphite, diphenyl stearylphosphite, trinonyltrithiophosphite, trilauryltrithiophosphite, trioctadecyltrithiophosphite, triphenyltrithiophosphite, tricresyltrithiophosphite, tris(p-nonylphenyl)trithiophosphite, tris(p-dodecylphenyl)trithiophosphite, tris(2-lauryloxycarbonylethyl)trithiophosphite, tris(dodecyloxycarbonylmethyl)trithiophosphite, tris(2-octadecyloxycarbonylethyl)trithiophosphite, tris(5-benzyloxycarbonylpentyl)trithiophosphite, tris[3-(p-octylphenoxycarbonyl)propyl]trithiophosphite, tris[2-(p-nonylphenoxycarbonyl)ethyl]trithiophosphite, tris(5-lauryloxycarbonylpentyl)trithiophosphite, tris(5-octadecyloxycarbonylpentyl)-trithiophosphite, tris[2-(p-dodecylphenoxycarbonyl)ethyl]trithiophosphite, tris[5-(p-octadecylphenoxycarbonyl)pentyl]trithiophosphite, trinonyltrithiophosphate, trilauryltrithiophosphate, trioctadecyltrithiophosphate, triphenyltrithiophosphate, tricresyltrithiophosphate, tris(p-nonylphenyl)trithiophosphate, tris(2-lauryloxycarbonylethyl)trithiophosphate, tris(dodecyloxycarbonylmethyl)trithiophosphate, tris(2-octadecyloxycarbonylethyl)trithiophosphate, tris(5-benzyloxycarbonylpentyl)trithiophosphate, tris[3-(p-octylphenoxycarbonyl)propyl]trithiophosphate, tris[2-(p-nonylphenoxycarbonyl)ethyl]trithiophosphate, tris(5-lauryloxycarbonylpentyl)trithiophosphate, tris(5-octadecyloxycarbonylpentyl)trithiophosphate, tris(2-cyclohexyloxycarbonylethyl)trithiophosphate, tris[2-(p-dodecylphenoxycarbonyl)ethyl]-trithiophosphate, tris[5-(p-octadecylphenoxycarbonyl)pentyl]-trithiophosphate, N,N',N''-tricyclohexylphosphorous triamide, hexamethylphosphorous triamide or the like.

Among these peroxide decomposers, the suitable compounds are as follows:

| | |
|---|---|
| dilauryl sulfide | (C-1) |
| dibenzyl sulfide | (C-2) |
| dioctyl thiodipropionate | (C-3) |
| dilauryl thiodipropionate | (C-4) |
| distearyl thiodipropionate | (C-5) |
| thiodiethanol distearate | (C-6) |
| stearyl 3-mercaptopropionate | (C-7) |
| trinonyl phosphite | (C-8) |
| triphenyl phosphite | (C-9) |
| trinonyl trithiophosphate | (C-10) |
| 2-mercaptobenzimidazole | (C-11) |
| zinc diethyldithiocarbamate | (C-12) |
| nickel dibutyldithiocarbamate | (C-13) |

Among these peroxide decomposers, the particularly suitable compounds are dilauryl thiodipropionate (C-4), distearyl thiodipropionate (C-5) and nickel dibutyldithiocarbamate (C-13).

The polyester-polyether block copolymer used in the present invention is a block copolymer having elastomeric properties wherein hard segments of polyester units and soft segments of polyether units are mutually and repeatedly arranged.

The polyester units composing the hard segments are formed predominantly from an aromatic dicarboxylic acid and an alkylene glycol having 2 to 15 carbon atoms, more particularly, the polyester may be produced from at least one dibasic acid (e.g., terephthalic acid, isophthalic acid, 1,2-di(4-carboxyphenoxy)ethane, naphthalenedicarboxylic acid, adipic acid, sebacic acid or 1,4-cyclohexanedicarboxylic acid and at least one glycol (e.g., ethylene glycol, propylene glycol, tetramethylene glycol, pentamethylene glycol, 2,2-dimethyltrimethylene glycol, hexamethylene glycol, decamethylene glycol, cyclohexanedimethanol, cyclohexanediethanol, benzenedimethanol or benzenediethanol), or from a hydroxy acid (e.g., p-($\beta$-hydroxyethoxy)benzoic acid or hydroxypivalic acid). When the polyester has a sufficiently high molecular weight for showing fiber-forming properties, it has preferably a melting point of 170° C or higher.

The polyether units composing the soft segments are an aliphatic long chain glycol having an average molecular weight of about 400 to 6000, preferably 600 to 3000, more preferably 800 to 2000, i.e., a polyoxyalkylene glycol wherein the alkylene moiety has 2 to 9 carbon atoms, such as poly(oxyethylene) glycol poly(oxypropylene) glycol or poly(oxytetramethylene) glycol. The polyether may be a homopolymer, random copolymer or block copolymer and further may be along or in a mixture of two or more kinds thereof. Moreover, the polyether may be a modified one which contains a small amount of an aliphatic or aromatic group, sulfur, nitrogen or phosphorus in the molecular chain.

The polyester-polyether block copolymer contains the polyether units in the amount of 1 to 85, preferably 5 to 80, more preferably 10 to 60% by weight on the basis of the whole copolymer.

The polyester-polyether block copolymer used in the present invention may be produced by conventional methods, but preferably by the following method.

That is, it is produced by heating a mixture of an alkyl ester of an aromatic dicarboxylic acid, a glycol and a polyether at around 150° to 260° C, removing alcohol which is produced by the ester exchange reaction, and then distilling off the excess glycol from the prepolymer thus obtained under a reduced pressure to give a high molecular weight polyester-polyether block copolymer. In this reaction, there may preferably be used a conventional catalyst (e.g., tetrabutyl titanate, tetrapropyl titanate, magnesium hexabutoxy hydrogen titanate or potassium titanyl oxalate) for making the reaction proceed more smoothly. Furthermore, there may be used an antioxidant [e.g., sym-di-$\beta$-naphthyl-p-phenylenediamine or 1,3,5-trimethyl-2,4,6-tris(3,5-di-tert.-butyl-4-hydroxybenzyl)benzene].

The addition amount of the <N—N> group-containing compound, the radical scavenger and/or the peroxide decomposer varies depending upon the kinds, degree of polymerization or molecular weight of the polyester-polyether block copolymer and further the kinds of such additives, but they are, generally, added each in a ratio of approximately 0.001 to 5.0, preferably 0.01 to 3.0, more preferably 0.1 to 2.0% by weight on the basis of the weight of the polyester-polyether block copolymer.

The addition order of these additives is not limited but may be added before or after the polymerization reaction or during the polymerization reaction, but preferably after the polymerization reaction. Moreover, the addition of the additives to the copolymer may be carried out in any conventional manner, for instance, the additives may be mixed with the copolymer by using a heat roll or an appropriate mixing apparatus, or the additives may be dry-blended with the copolymer in a hopper of an extruder and then the mixture may be melt-extruded.

The polyester-polyether block copolymer composition of the present invention may contain any other components, such as pigments (e.g., carbon black or titanium oxide), ultraviolet absorbers (e.g., Tinubin 327 and 328, trade name of Ciba-Geigy), hydrolysis stabilizers, fire retardants, modifiers or fillers.

The polyester-polyether block copolymer composition of the present invention is very stable even in the presence of heavy metals, and therefore, the polymer can be completely prevented from the deterioration induced by contact with heavy metals during the production of the polymer, the processing step thereof into fibers, films or molded articles, or the use of the product. Thus, the present composition can give a high quality product, and as the result, the utility of the composition and the product therefrom is largely expanded.

The present invention is illustrated by the following Examples but is not limited thereto.

In the Examples, the used polymer and additives are as follows:

1. Polymer

The polymer is produced as follows:

A polymerization vessel is charged with poly(oxytetramethylene) glycol having a molecular weight of 1275 (95.63 g. 0.075 mol), dimethyl terephthalate (194 g, 1.0 mol) and tetramethylene glycol (135 g, 1.5 mol), and thereto are added a prescribed amount of the additives. After replacing the air in the vessel with nitrogen gas, a 20% solution of Mg[HTi(OBu)$_6$]$_2$ in butanol (1.0 ml, as a catalyst) is added to the mixture. The mixture is heated with strong agitation at 200° C under atmospheric pressure for one hour and 20 minutes. During 60 minutes, the temperature is raised to 260° C and the pressure is reduced until it is less than 1 mmHg. While maintaining this temperature and pressure, the mixture is subjected to a polymerization reaction for 50 minutes to give a polymer having a melting point of 210° C and having excellent elasticity (Polymer-P).

2. Additives

The additives used in the Examples and in the Comparative Examples are those shown by abbreviation hereinbefore.

EXAMPLE

To the polymer is added Tinubin 327 (an ultraviolet absorber made by Ciba-Geigy; 0.5% by weight on the basis of the polymer) and thereto are added the prescribed amount (as mentioned in the following Table 1) of the additives. From the mixture, a test piece having 2 mm in thickness is prepared and the test piece is adhered on a surface of a copper panel which is homogeneously polished. The copper panel adhered with the test piece is kept in an oven at 150° C, and then the time (day) for deterioration is measured. The time for deterioration is determined by the number of days from the initiation for keeping the test piece in the oven until the test piece is broken when it is bent at an angle of 180° C.

The results are shown in the following Table 1, wherein A means the compound containing the group (I) or (II), B means the radical scavenger and C means the peroxide decomposer, and the amount of the additives is shown by part by weight on the basis of the polymer (100 parts by weight).

Table I

| Example No. | Additives (amount) A | | B | | C | | Time for deterioration (day) |
|---|---|---|---|---|---|---|---|
| 1 | A-4 | (0.3) | B-8 | (0.3) | — | | 11 |
| 2 | A-21 | (0.3) | B-13 | (0.3) | — | | 13 |
| 3 | A-4 | (0.3) | — | | C-5 | (0.3) | 18 |
| 4 | A-21 | (0.3) | — | | C-11 | (0.3) | 14 |
| 5 | A-4 | (0.3) | B-9 | (0.3) | C-5 | (0.3) | 42 |
| 6 | A-4 | (0.3) | B-13 | (0.3) | C-5 | (0.3) | 38 |
| 7 | A-6 | (0.3) | B-9 | (0.3) | C-3 | (0.3) | 26 |
| 8 | A-7 | (0.3) | B-13 | (0.3) | C-4 | (0.3) | 31 |
| 9 | A-8 | (0.3) | B-1 | (0.3) | C-5 | (0.3) | 19 |
| 10 | A-10 | (0.3) | B-9 | (0.3) | C-5 | (0.3) | 37 |
| 11 | A-17 | (0.3) | B-8 | (0.3) | C-11 | (0.3) | 33 |
| 12 | A-20 | (0.3) | B-1 | (0.3) | C-11 | (0.3) | 37 |
| 13 | A-21 | (0.15) | B-8 | (0.15) | C-5 | (0.15) | 42 |
| 14 | A-21 | (0.15) | B-9 | (0.15) | C-5 | (0.15) | 38 |
| 15 | A-22 | (0.3) | B-3 | (0.3) | C-5 | (0.3) | 29 |
| 16 | A-23 | (0.3) | B-9 | (0.3) | C-11 | (0.3) | 16 |
| 17 | A-25 | (0.3) | B-8 | (0.3) | C-11 | (0.3) | 40 |
| 18 | A-27 | (0.3) | B-9 | (0.3) | C-4 | (0.3) | 33 |
| 19 | A-28 | (0.3) | B-13 | (0.3) | C-4 | (0.3) | 19 |
| 20 | A-29 | (0.45) | B-13 | (0.45) | C-4 | (0.45) | 45 |
| 21 | A-30 | (0.45) | B-8 | (0.45) | C-3 | (0.45) | 34 |
| 22 | A-31 | (0.3) | B-8 | (0.3) | C-5 | (0.3) | 22 |
| 23 | A-32 | (0.3) | B-8 | (0.3) | C-5 | (0.3) | 31 |
| 24 | A-33 | (0.3) | B-9 | (0.3) | C-5 | (0.3) | 26 |
| 25 | A-35 | (0.3) | B-8 | (0.3) | C-5 | (0.3) | 33 |
| 26 | *A-36 | (0.3) | B-9 | (0.3) | C-4 | (0.3) | 59 |
| 27 | A-37 | (0.3) | B-8 | (0.3) | C-5 | (0.3) | 25 |
| 28 | A-38 | (0.3) | B-16 | (0.3) | C-13 | (0.3) | 28 |

[Note]:
*A compound sold from Adeca Argus Chemical Co. (Trade name: Mark CDA-3)

COMPARATIVE EXAMPLES

In the same manner as described in the above Examples, the time for deterioration is measured on the composition wherein each additive is used alone or a mixture of the radical scavenger and the peroxide decomposer is used without the compound containing the group (I) or (II). The results are likewise shown in the following Table 2.

Table 2

| Example No. | Additives (amount) A | | B | | C | | Time for deterioration (day) |
|---|---|---|---|---|---|---|---|
| 1 | A-4 | (0.5) | — | | — | | 1 or less |
| 2 | A-21 | (0.5) | — | | — | | 1 " |
| 3 | A-29 | (0.5) | — | | — | | 1 " |
| 4 | — | | B-8 | (0.5) | — | | 1 " |
| 5 | — | | B-13 | (0.5) | — | | 1 " |
| 6 | — | | — | | C-5 | (0.5) | 1 " |
| 7 | — | | B-8 | (0.5) | C-5 | (0.5) | 1 " |
| 8 | — | | B-13 | (0.5) | C-5 | (0.5) | 1 " |

What is claimed is:

1. A polyester-polyether block copolymer composition comprising a polyester-polyether block copolymer consisting of segments of polyester units produced from an aromatic dicarboxylic acid and an alkylene glycol having 2 to 15 carbon atoms and segments of polyether units of an aliphatic glycol having a molecular weight of about 400 to 6,000 wherein said polyether units are contained in the ratio of 1 to 85% by weight on the basis of the whole copolymer; a stabilizing amount for said block copolymer of at least one compound containing the group of the following formula:

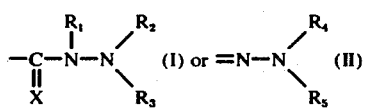

wherein X is oxygen or sulfur, $R_1$, $R_2$ and $R_3$ are each hydrogen or an organic residue selected from the group consisting of a straight or branched, saturated or unsaturated aliphatic hydrocarbon group, a saturated or unsaturated alicyclic hydrocarbon group, an aromatic hydrocarbon group, a heterocyclic group, a group wherein a hydrocarbon or heterocyclic group bonds to the nitrogen via oxygen, sulfur, imino, sulfinyl, sulfonyl, carbonyl, thiocarbonyl or hydrazo, carbazoyl, thiocarbazoyl, hydrazino or a group wherein any C-C bond in the hydrocarbon groups is intervened with oxygen, sulfur, imino, sulfinyl, or sulfonyl, or $R_2$ and $R_3$ forms a Schiff's base with the adjacent nitrogen, and $R_4$ and $R_5$ are each hydrogen or an organic residue which is the same as defined for $R_1$, $R_2$ and $R_3$; and a stabilizing amount for said block copolymer of at least one phenolic or amine radical scavenger and/or at least one peroxide decomposer.

2. The polyester-polyether block copolymer composition according to claim 1, wherein the compound containing the group of the formula (I) or (II) is a member selected from the group consisting of the compounds having the following formulae:
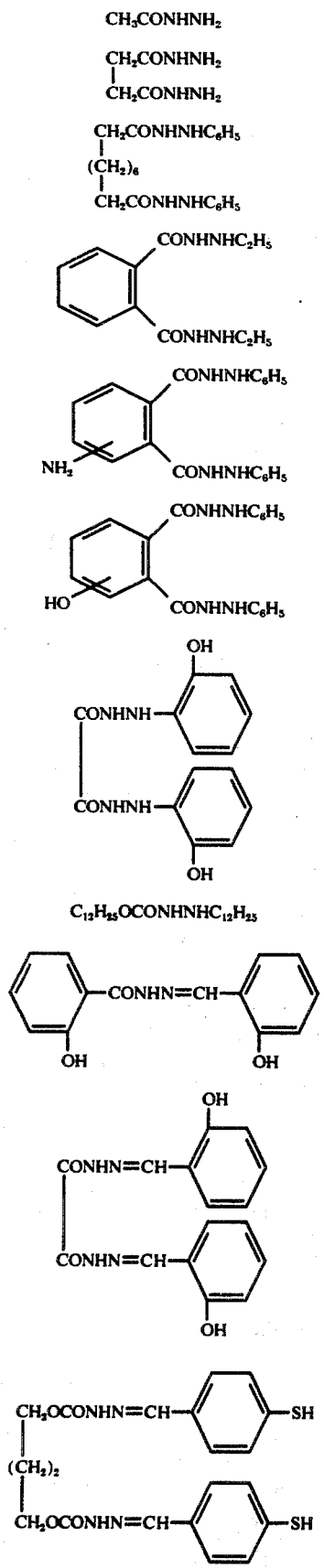
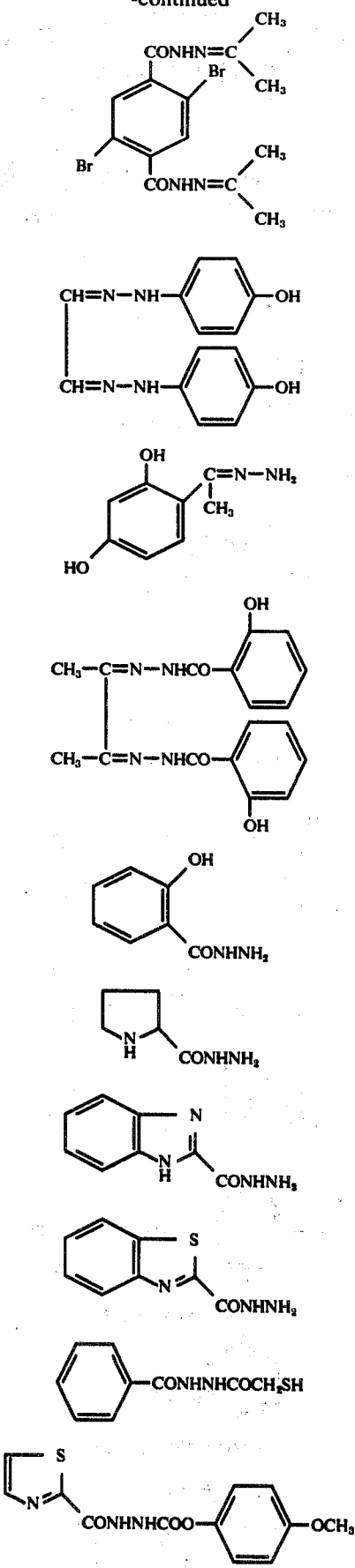

-continued

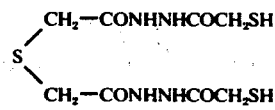
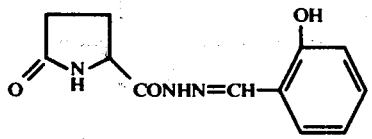
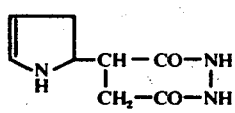
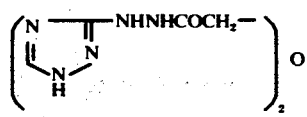
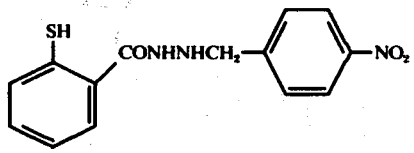
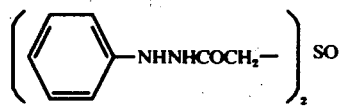
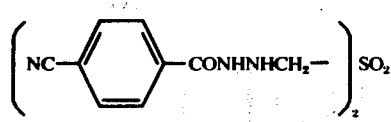
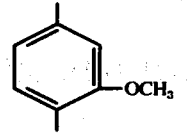
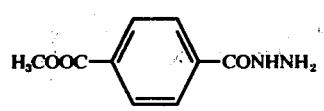

-continued

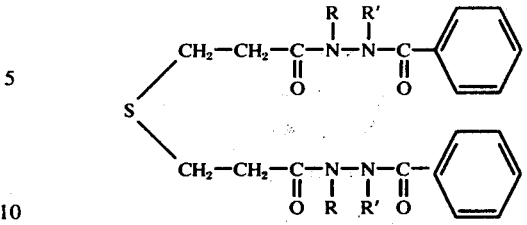

wherein R and R' are H or an alkyl having 4 to 8 carbon atoms

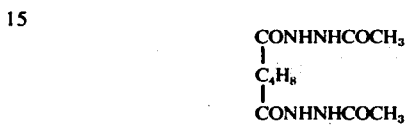
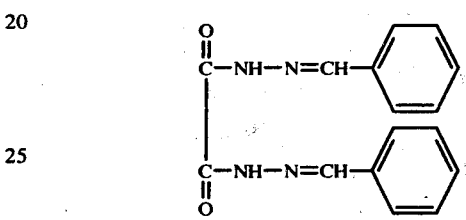

3. The polyester-polyether block copolymer composition according to claim 1, wherein the phenolic or amine radical scavenger is a member selected from the group consisting of 2,6-di-tert.-butyl-4-methylphenol, 2,4,6-tri-tert.-butylphenol, 2,2'-methylenebis(4,6-di-tert.-butylphenol), 4,4'-methylenebis-(2,6-di-tert.-butylphenol), 2,2'-ethylidenebis(4,6-di-tert.-butylphenol), 4,4'-isopropylidenebis(2,6-di-tert.-butylphenol), 4,4'-butylidenebis(2,6-di-tert.-butylphenol), 2,4,6-tris(3,5-di-tert.-butyl-4-hydroxybenzyl)mesitylene, pentaerythritol tetrakis(3,5-di-tert.-butyl-4-hydroxyhydrocinnamate, N-caproyl-4-aminophenol, 2,2'-thiobis(4,6-di-tert.-butylphenol), N,N'-di-sec.-butyl-p-phenylenediamine, phenyl-α-naphthylamine, N-phenyl-N'-isopropyl-p-phenylenediamine, N,N'-di-β-naphthyl-p-phenylenediamine and 4,4'-bis(α,α-dimethylbenzyl)diphenylamine.

4. The polyester-polyether block copolymer composition according to claim 1, wherein the peroxide decomposer is a member selected from the group consisting of dilauryl sulfide, dibenzyl sulfide, dioctyl thiodipropionate, dilauryl thiodipropionate, distearyl thiodipropionate, thiodiethanol distearate, stearyl 3-mercaptopropionate, trinonyl phosphite, triphenyl phosphite, trinonyl trithiophosphate, 2-mercaptobenzimidazole, zinc diethyldithiocarbamate and nickel dibutyldithiocarbamate.

5. The polyester-polyether block copolymer composition according to claim 1, wherein the compound containing the group (I) or (II) is added in an amount of 0.001 to 5.0% by weight on the basis of the weight of the copolymer.

6. The polyester-polyether block copolymer composition according to claim 5, wherein the amount of the compound containing the group (I) or (II) is in a range of 0.01 to 3.0 % by weight.

7. The polyester-polyether block copolymer composition according to claim 5, wherein the amount of the compound containing the group (I) or (II) is in a range of 0.1 to 2.0% by weight.

8. The polyester-polyether block copolymer composition according to claim 1, wherein the radical scavenger is added in an amount of 0.001 to 5.0% by weight on the basis of the weight of the copolymer.

9. The polyester-polyether block copolymer composition according to claim 8, wherein the amount of the radical scavenger is in a range of 0.01 to 3.0% by weight.

10. The polyester-polyether block copolymer composition according to claim 8, wherein the amount of the radical scavenger is in a range of 0.1 to 2.0% by weight.

11. The polyester-polyether block copolymer composition according to claim 1, wherein the peroxide decomposer is added in an amount of 0.001 to 5.0% by weight on the basis of the weight of the copolymer.

12. The polyester-polyether block copolymer composition according to claim 11, wherein the amount of the peroxide decomposer is in a range of 0.01 to 3.0% by weight.

13. The polyester-polyether block copolymer composition according to claim 11, wherein the amount of the peroxide decomposer is in a range of 0.1 to 2.0% by weight.

14. The polyester-polyether block copolymer composition according to claim 1, wherein the polyester-polyether block copolymer consists of segments of polyester units produced from a dibasic acid selected from the group consisting of terephthalic acid and a mixture of terephthalic acid and isophthalic acid and a glycol selected from the group consisting of ethylene glycol and tetramethylene glycol and segments of polyether units of poly(oxytetramethylene) glycol having a molecular weight of 400 to 6000.

15. The polyester-polyether block copolymer composition according to claim 18, wherein the content of the polyether units is in a range of 5 to 80% by weight.

16. The polyester-polyether block copolymer composition according to claim 18, wherein the content of the polyether units is in a range of 10 to 60% by weight.

17. A polyester-polyether block copolymer composition comprising a polyester-polyether block copolymer consisting of segments of polyester units produced from a dibasic acid selected from the group consisting of terephthalic acid and a mixture of terephthalic acid and isophthalic acid and a glycol selected from the group consisting of ethylene glycol and tetramethylene glycol and segments of polyether units of poly(oxytetramethylene) glycol having a molecular weight of about 400 to 6,000 wherein said polyether units are contained in the ratio of 1 to 85% by weight on the basis of the whole copolymer; at least one compound containing the group of the following formula:

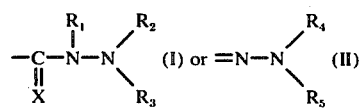

wherein X is oxygen or sulfur, $R_1$, $R_2$ and $R_3$ are each hydrogen or an organic residue selected from the group consisting of a straight or branched, saturated or unsaturated aliphatic hydrocarbon group, a saturated or unsaturated alicyclic hydrocarbon group, an aromatic hydrocarbon group, a heterocyclic group, a group wherein a hydrocarbon or heterocyclic group bonds to the nitrogen via oxygen, sulfur, imino, sulfinyl, sulfonyl, carbonyl, thiocarbonyl, or hydrazo, carbazoyl, thiocarbazoyl, hydrazino or a group wherein wherein any C—C bond in the hydrocarbon groups is intervened with oxygen, sulfur, imino, sulfinyl, or sulfonyl, or $R_2$ and $R_3$ forms a Schiff's base with the adjacent nitrogen, and $R_4$ and $R_5$ are each hydrogen or an organic residue which is the same as defined for $R_1$, $R_2$ and $R_3$; at least one phenolic or amine radical scavenger and/or at least one peroxide decomposer, wherein said compound containing the group (I) or (II), said radical scavenger and said peroxide decomposer are each present in said composition in an amount of 0.001 to 5.0% by weight on the basis of the weight of said copolymer.

* * * * *